(12) United States Patent
Cowart et al.

(10) Patent No.: US 6,584,520 B1
(45) Date of Patent: Jun. 24, 2003

(54) METHOD FOR DYNAMICALLY GENERATING A FILE ALLOCATION TABLE BASE UPON FILES STORAGE INFORMATION ON A CD-ROM FOR RETRIEVING COMPRESSED FILES DIRECTLY FROM THE CD-ROM

(76) Inventors: Richard Cowart, 4900 Pineland Dr., Savannah, GA (US) 31405; Larry Cowart, 3 Cypress St., Bloomingdale, GA (US) 31322

( * ) Notice: Subject to any disclaimer, the term of this patent is extended or adjusted under 35 U.S.C. 154(b) by 0 days.

(21) Appl. No.: 08/848,989

(22) Filed: May 2, 1997

Related U.S. Application Data

(62) Division of application No. 08/261,793, filed on Jun. 20, 1994, now Pat. No. 5,668,970.

(51) Int. Cl.[7] .......................... G06F 3/00; G06F 13/12; G06F 12/00; G06F 12/02
(52) U.S. Cl. .............................. 710/68; 710/5; 710/68; 711/206
(58) Field of Search ................................. 707/200, 204; 711/206; 369/32, 124; 341/51; 348/384; 710/68, 5, 65

(56) References Cited

U.S. PATENT DOCUMENTS

| | | | | |
|---|---|---|---|---|
| 5,001,569 A | * | 3/1991 | Shigyo | 358/296 |
| 5,040,110 A | * | 8/1991 | Miki et al. | 707/200 |
| 5,285,275 A | * | 2/1994 | Abe | 348/384 |
| 5,323,367 A | * | 6/1994 | Tamura et al. | 369/32 |
| 5,357,614 A | * | 10/1994 | Pattisam et al. | 710/68 |
| 5,457,675 A | * | 10/1995 | Suzuki et al. | 369/124 |
| 5,488,365 A | * | 1/1996 | Seroussi et al. | 341/51 |
| 5,668,970 A | * | 9/1997 | Cowart et al. | 711/206 |
| 5,675,780 A | * | 10/1997 | Plant-Mason et al. | 707/6 |
| 5,724,582 A | * | 3/1998 | Pelanek et al. | 707/204 |

OTHER PUBLICATIONS

Vaughan–Nichols, Steven J., "Zippity PKzip," PC Computing, v3, n2, p96(4), Feb. 1990.*

* cited by examiner

Primary Examiner—Thomas Lee
Assistant Examiner—Chun Cao

(57) ABSTRACT

In a typical storage medium, such as a magnetic hard disk, there is a file allocation table (FAT) stored thereon which is referenced each time the medium is accessed. Many data processing mechanisms rely on the existence of this FAT for accessing the medium. However, some storage media, such as CD-ROM's, do not have FAT's stored thereon. In order to properly interface FAT reliant data processing mechanisms with storage media having no FAT, file storage information is first obtained from the storage medium. Then, using this file storage information, a FAT having a format compatible with the data processing mechanisms is generated. Information from the FAT is provided to the mechanisms and, using this FAT information, the mechanisms can access information on the storage medium. Thus, even though the storage medium has no FAT, it is still accessible by FAT reliant data processing mechanisms.

1 Claim, 3 Drawing Sheets

| Cluster | File name | Information/status |
|---|---|---|
| 1 | | Free |
| 2 | X | Cluster 6 |
| 3 | Y | Cluster 5 |
| 4 | | Free |
| 5 | | Cluster 8 |
| 6 | | Cluster 10 |
| 7 | | Free |
| 8 | | Cluster 9 |
| 9 | | End of File Y |
| 10 | | End of File X |

| Cluster | File name | Information/status |
|---------|-----------|--------------------|
| 1 | X | Cluster 2 |
| 2 |   | Cluster 3 |
| 3 |   | Cluster 4 |
| 4 |   | Cluster 5 |
| 5 |   | Cluster 6 |
| 6 |   | Cluster 7 |
| 7 |   | Cluster 8 |
| 8 |   | Cluster 9 |
| 9 |   | Cluster 10 |
| 10 |   | End of File X |

METHOD FOR DYNAMICALLY GENERATING A FILE ALLOCATION TABLE BASE UPON FILES STORAGE INFORMATION ON A CD-ROM FOR RETRIEVING COMPRESSED FILES DIRECTLY FROM THE CD-ROM

This application is a division of U.S. patent application Ser. No. 08/261,793 filed Jun. 20, 1994, now U.S. Pat. No. 5,668,970.

FIELD OF THE INVENTION

This invention relates generally to computer systems and more particularly to a method and apparatus for interfacing a data processing mechanism, whether it be software or hardware, to a storage medium having no file allocation table maintained thereon.

BACKGROUND OF THE INVENTION

A typical computer system comprises a microprocessor, a memory, various peripherals, and a mass storage device. The mass storage device is used to store data files, applications programs, operating system files, and in general, any information that a user wishes to save for subsequent access. In a majority of computer systems, this mass storage device takes the form of a magnetic hard disk drive. In a typical hard disk, the storage area of the disk is separated into a plurality of sectors with each sector having a head, track, and sector designation. Usually, adjacent sectors are grouped into clusters for simplifying access. The size of these clusters may vary from disk to disk. To facilitate access to the clusters, a file allocation table (FAT) is typically stored and maintained on a specific area of the hard disk. The FAT specifies for each cluster whether the cluster is currently being used to store information or whether the cluster may be written to. If the cluster is currently storing information, the FAT specifies to which file the stored information corresponds. Thus, the FAT behaves as a central repository of file storage information for the entire hard disk.

The FAT is consulted each time the hard disk is accessed. For read operations, the FAT is consulted to determine where the desired file may be found, and for write operations, the FAT is used to determine which clusters are available for storing data. Because the FAT is consulted for each disk access, it is important from a practical standpoint that access to the FAT be relatively fast. Otherwise, system performance will seriously suffer. For most magnetic storage media, such as hard and floppy disks, FAT access time is not a problem. Hence, a FAT may be effectively implemented on such media.

Another storage medium which has become popular in recent years is the compact disc read only memory (CD-ROM). CD-ROM's are desirable because of their large storage capacity. A drawback, however, is that access to information stored on a CD-ROM is relatively slow due to the current limitations of CD-ROM drives. Due in part to this slow access time, and more fundamentally to the fact that a CD-ROM is not a rewritable medium, a FAT is typically not maintained on a CD-ROM. Instead, file storage information is stored close to the files themselves, which means that the file storage information is spread throughout the CD-ROM. A practical consequence of this arrangement is that many application programs, or data processing mechanisms in general, which rely on the presence of a FAT, cannot access a CD-ROM. These FAT reliant data processing mechanisms include data compression programs. Because data compression programs cannot properly access a CD-ROM, it means that CD-ROM's currently cannot store compressed data files. The ability to store compressed data files is quite desirable because it significantly increases the amount of information a CD-ROM can store. Currently, however, due to the lack of a FAT, CDROM's do not have this capability.

SUMMARY OF THE INVENTION

In accordance with the present invention, a mechanism is provided for interfacing a storage medium having no FAT stored thereon (such as a CD-ROM) with FAT reliant data processing mechanisms (such as data compression programs) so as to allow the FAT reliant mechanisms to properly access the storage medium. Using such an interfacing mechanism, compressed data files may be stored on and read from a CD-ROM. This, in turn, increases the information storage capacity of the CD-ROM.

According to the method of the present invention, interfacing is preferably achieved by first obtaining file storage information from the storage medium. This file storage information preferably specifies for the medium which files are stored thereon and where those files are located. Because the storage medium has no FAT, and hence no central repository of storage information, file storage information is preferably obtained by gathering information from various portions of the medium. Once the file storage information is obtained, it is used to dynamically generate a FAT. This FAT preferably has a format compatible with the data processing mechanisms, and specifies for at least one file on the storage medium the location or locations at which the file is found. The generated FAT is preferably stored in memory so that it may be subsequently accessed. Once generated, information from the FAT is provided to the data processing mechanisms. Using this information, a mechanism may now access information stored on the storage medium.

Information access is preferably achieved by first receiving a request from a data processing mechanism. A determination is made as to whether this request is for additional FAT information or for data from the storage medium. If FAT information is requested, the requested information is provided by referencing the FAT stored in memory. If data is desired, the data request (which is based on FAT information) is translated into one or more physical locations on the storage medium. Information is then read from these locations and relayed to the data processing mechanism. A FAT reliant mechanism is thus able to successfully access information stored on a medium having no FAT maintained thereon.

DETAILED DESCRIPTION OF THE PREFERRED EMBODIMENT

Figures 1, 2:
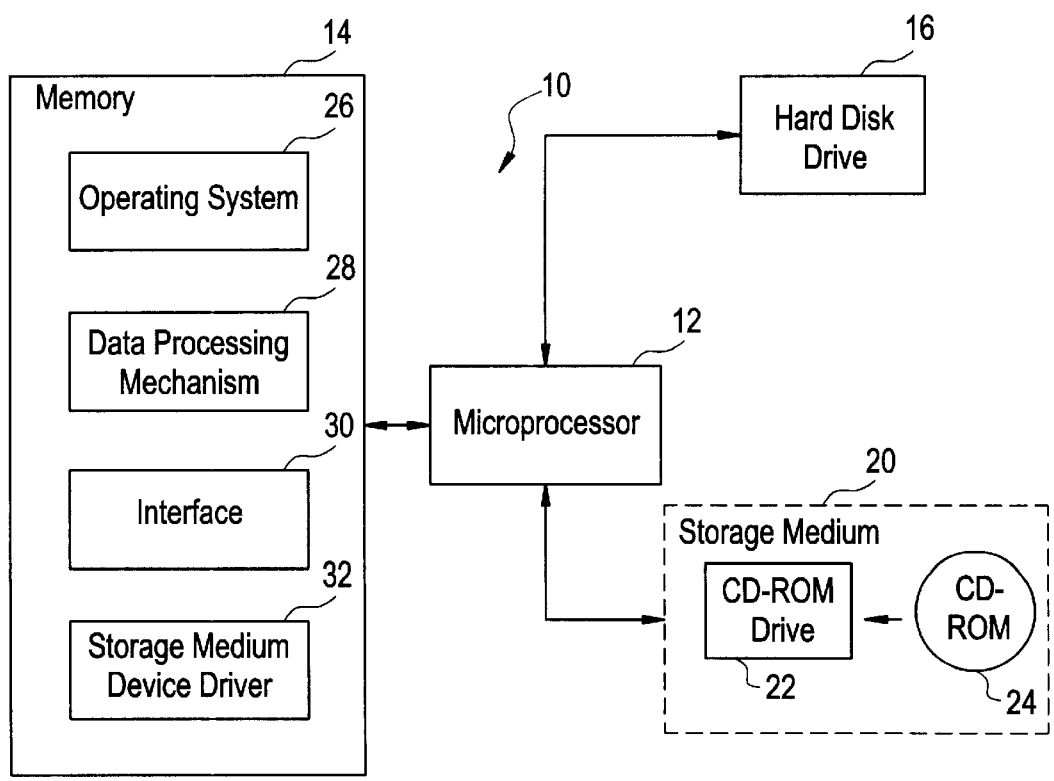
FIG. 1 is an example of a file allocation table for a storage medium having ten clusters.
FIG. 2 is a block diagram of a system wherein the present invention is implemented.

Before describing the invention in detail, a brief discussion will be provided of what 25 information is contained in a file allocation table (FAT), and how that information is used, in order to facilitate a complete understanding of the present invention. A FAT typically is an array of file storage information, usually stored on a specific area of a storage medium, which specifies for each cluster (or storage unit) on the medium the current status of the cluster. The FAT contains an entry for each cluster, and each entry provides information on whether the corresponding cluster is free to receive data or is currently storing data, and if the cluster is currently holding data, to which file the data corresponds. Thus, the FAT serves as a central repository of file storage and allocation information for the entire medium. For a storage medium having a FAT stored thereon, the FAT is accessed each time the storage medium is accessed. On read accesses, the FAT is consulted to determine which clusters hold data corresponding to a particular file, and on write accesses, the FAT is used to determine which clusters are free to receive data. After each write operation, the FAT is updated to keep its contents current.

The structure of a FAT is best understood with reference to an example. For illustrative purposes, suppose that a storage medium has ten clusters, with clusters 2, 6, and 10 holding data for a file X, clusters 3, 5, 8, and 9 holding data for a file Y, and clusters 1, 4, and 7 being free. A sample FAT for such a storage medium is provided in FIG. 1. As mentioned above, clusters 1, 4, and 7 are free; thus, the entries corresponding to these clusters indicate in their information/status fields that these clusters are free. For the clusters currently holding data corresponding to files X and Y, file correspondence information is stored in the information/status fields.

To elaborate, clusters 2, 6, and 10 hold data for file X. In the file name field of the entry for cluster 2, there is a reference to file X to indicate that this is the cluster at which data for file X begins. Then, in the information/status field for this entry, there is a reference to cluster 6, which indicates that cluster 6 is the next cluster at which data for file X is stored. Proceeding further, in the information/status field of the entry for cluster 6, there is a reference to cluster 10, indicating that cluster 10 is the next cluster at which data for file X is stored. Finally, in the entry for cluster 10, there is stored an end of file indicator in the information/status field to signal that this is the last cluster containing data corresponding to file X. Thus, the FAT provides a self-contained map of where data for any particular file is stored on the medium. As made evident by this example, file storage information in a FAT is typically stored in a linked-list fashion. Once the starting cluster for a file is found, the rest of the clusters corresponding to the file will also be found iteratively from each cluster. It is this type of FAT information that many data processing mechanisms rely upon to access a storage medium.

With this background information in mind, the present invention will now be described. With reference to FIG. 2, there is shown a system 10 wherein the present invention is implemented, the system 10 preferably comprising a memory 14, a hard disk drive 16, a secondary storage medium 20, and a microprocessor 12 coupled to each of the other components 14, 16, 18. The hard disk drive 16 preferably stores all of the program files used to operate the system 10, such as operating system 26, data processing mechanism 28, the interface 30 of the present invention, and the device driver 32 for storage medium 20. Upon boot-up, these files are preferably loaded into memory 14, whereupon they are executed by microprocessor 12 to carry out the functions of the system 10. In the secondary storage medium 20, data files and other program files may be stored. These files may be accessed from time to time by microprocessor 12 for data retrieval or other purposes.

To facilitate a full description of the invention, several assumptions will be made herein with regard to system 10. First, it will be assumed that storage medium 20 has no FAT stored or maintained thereon. Instead, file storage information for medium 20 is spread throughout the medium 20 in such a manner that storage information for a file is stored within close physical proximity to the file itself. In the system 10 described herein, storage medium 20 takes the form of a CD-ROM drive 22 having a CD-ROM disc 24 inserted therein. It should be noted, however, that storage medium 20 may take any form so long as it has no FAT stored or maintained thereon. A second assumption is that the data processing mechanism 28 requires a FAT in order to properly access storage medium 20. That is, mechanism 28 is FAT reliant. In the system shown in FIG. 1, mechanism 28 takes the form of a software program which is executed by microprocessor 12. In many applications, this will be the case; however, it should be noted that mechanism 28 need not be a software program but may instead be any data processing mechanism (even a hardware mechanism) which relies on a FAT for accessing a storage medium. Third, one of the advantageous applications of the present invention is that of allowing a data compression mechanism to access compressed data stored on a CD-ROM. Thus, for illustrative purposes, mechanism 28 will be assumed to be a data compression program, and CD-ROM 24 will be assumed to have a compressed file stored thereon. With these assumptions in mind, the invention will now be described in detail.

The operation of system 10 is controlled by the program modules loaded into memory 14 and executed by microprocessor 12. One of the programs which controls the operation of the system 10 is operating system 26. Operating system 26 serves as an interface between the system 10 and a user, and also provides a general environment in which all of the other components operate. In a sense, operating system 26 is the "glue" that binds the system 10 together. Another program module which is loaded into memory 14 is storage medium device driver 32. This driver 32 acts as an interface between the storage medium 20 and any mechanism which accesses the medium 20. Driver 32 performs several functions. One function is to gather file storage information from medium 20. Recall that medium 20 has no FAT stored thereon; thus, there is no central repository of file storage information for the medium 20. This means that file storage information is spread throughout the medium. Thus, in order to gather file storage information for the entire medium 20, driver 32 preferably reads the various portions of the medium 24 wherein file storage information is stored. This information is later used for accessing the medium 20. Note that while driver 32 gathers file storage information, it does not arrange the information into FAT format usable by a FAT reliant data processing mechanism. Another function of driver 32 is to translate access requests received from other modules into hardware calls. It is these hardware calls that are actually sent to the CD-ROM drive 22 to access information on the CD-ROM 24. Driver 32 is usually tailored to a particular CD-ROM drive 22 and is often provided by the CD-ROM drive manufacturer.

Data processing mechanism 28 is another program module which is loaded into memory 14 and run by microprocessor 12. Mechanism 28 may be a data compression program, as it is in the present example, or it may be some other mechanism which accesses information on a storage medium. Mechanism 28 typically accesses a storage medium through a block device driver which is logically attached to the medium. The block device driver provides FAT information relating to the storage medium to the mechanism 28 and, using this information, the mechanism can access information stored on the medium. The device driver 32 of system 10, however, is not a block device driver in that it is incapable of providing FAT information to mechanism 28. As noted above, while driver 32 does gather file storage information for the CD-ROM 24, this information is not arranged into a format compatible with mechanism 28. Thus, without some mechanism for interfacing mechanism 28 and driver 32, they cannot effectively communicate with each other, which means that mechanism 28 cannot access the storage medium 20.

To facilitate communication between mechanism 28 and driver 32, the present invention provides interface 32. In the preferred embodiment, interface 32 takes the form of a program module which is loaded into memory 14 at the time of system boot-up; however, it should be noted that interface 32 may be implemented using various other mechanisms such as combinatorial logic, programmable read-only-memories (PROM's), programmable logic arrays (PLA's), application specific integrated circuits (ASIC's), etc. These other implementations are within the scope of the present invention. Interface 32 of the present invention performs two major functions. First, it generates FAT information using file storage information from storage medium 20, and provides this FAT information to mechanism 28. By so doing, interface 32 allows the mechanism 28 to ascertain how files are stored on the medium and thereby submit proper access requests. Second, interface 32 acts as an interpreter to translate access requests received from mechanism 28 into requests that are understood by device driver 32. This makes it possible for mechanism 28 to actually access the medium 20 and to retrieve desired data therefrom.

Figure 3:
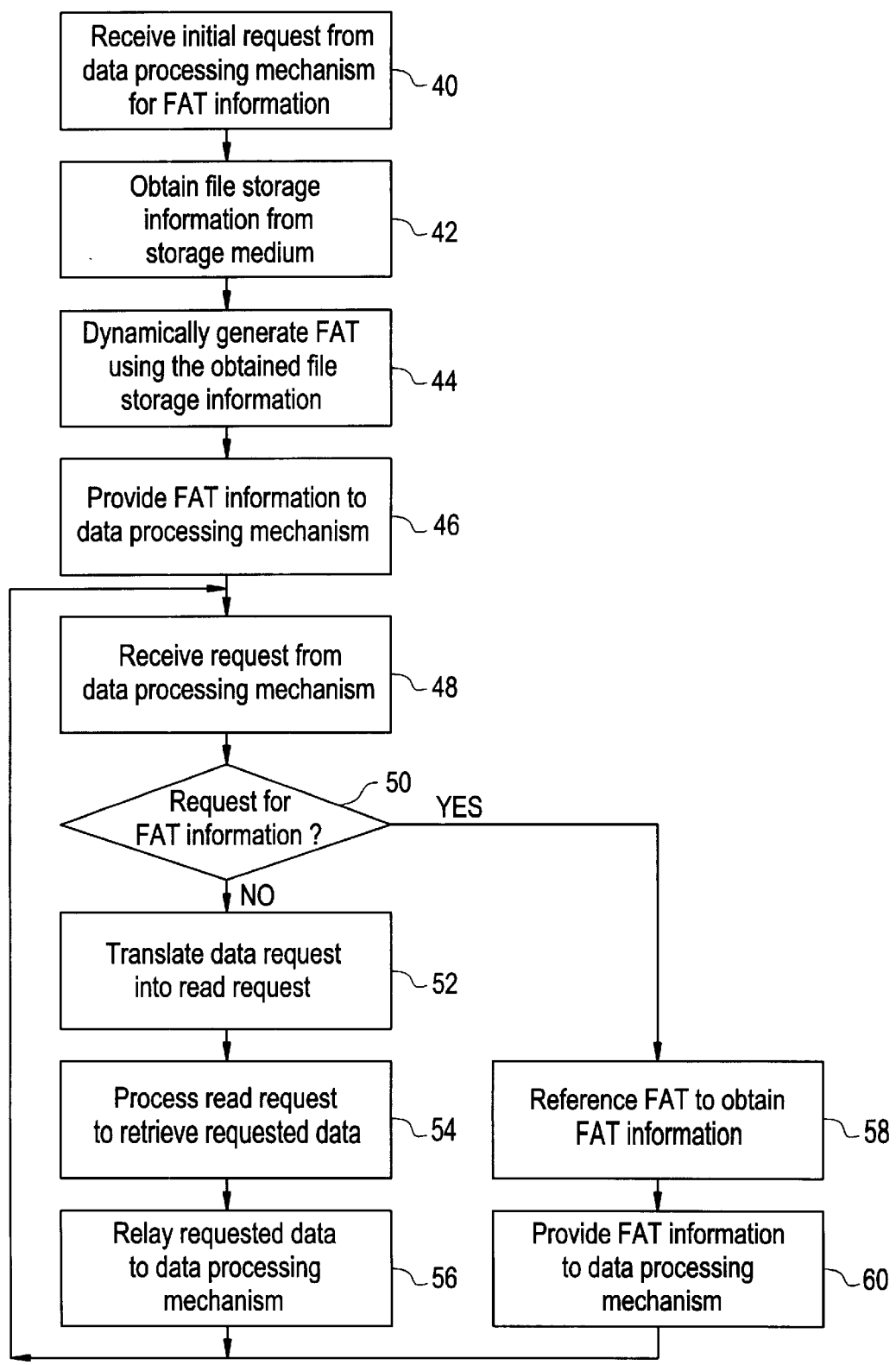
FIG. 3 is an operation flow diagram for the interface 30 of FIG. 2.

Referring now to FIG. 3, there is shown an operational flow diagram for interface 32. Interface 32 preferably begins operation by receiving 40 an initial request from data processing mechanism 28 for FAT information. This is the initial communication between mechanism 28 and interface 32 wherein mechanism 28 is trying to ascertain which files are stored on the storage medium 20 and in what locations these files can be found. Upon receiving this request, interface 32 obtains 42 file storage information from the storage medium 20. As mentioned above, device driver 32 gathers file storage information for the medium 20 by traversing and reading various portions of the medium 20. Since driver 32 has already gathered this information, interface 32 need not read the medium 20 but may instead obtain the file storage information by querying the driver 32. In the case where driver 32 does not gather this information, interface 32 preferably issues the proper requests to cause the driver 32 to read the medium 20 to retrieve file storage information therefrom. These requests will vary from driver to driver and medium to medium and thus, are implementation specific.

Figures 4, 5:
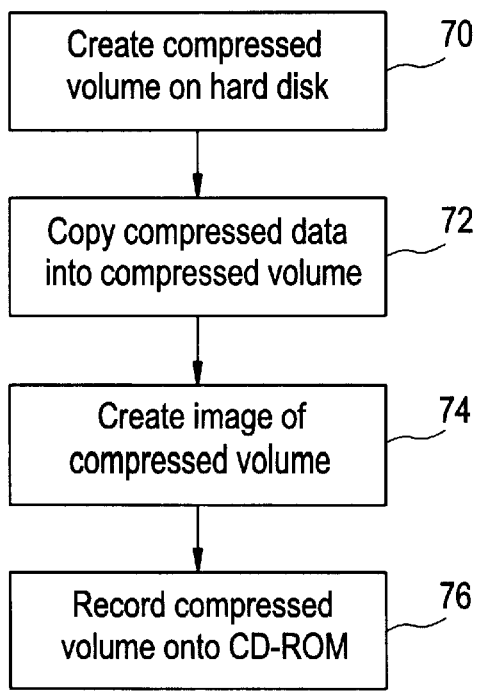
FIG. 4 is an example of a file allocation table generated by the interface 30 of FIG. 2.
FIG. 5 is a flow diagram of a method for storing a compressed file onto a CD-ROM.

Once file storage information for medium 20 is obtained, interface 32 dynamically generates 44 a FAT using the obtained information. To illustrate this step clearly, suppose that the file storage information for medium 20 indicates that there is only one file (file X) stored on the medium 20, and that this file X is ten clusters in length,. Suppose further that these ten clusters are used sequentially to store data corresponding to file X. In order to generate a proper FAT using this information, recall that a FAT has an entry for each cluster and that each entry specifies the status of the cluster. Recall further that all of the clusters corresponding to a particular file are linked together in a linked-list fashion. A FAT for medium 20 which conforms to these requirements is shown FIG. 4. Notice that there are ten entries, each entry corresponding to a cluster, and that there is an information/status field for each entry specifying that entry's status. Cluster 1 is the cluster at which file X begins; thus, X is inserted into the file name field of entry 1 to so indicate. Cluster 10 is the last cluster storing data corresponding to file X; hence, an end of file indicator is inserted into the information/status field of entry 10. Note further that each entry references the next entry to tie all of the entries together. That is, entry 1 (the entry for cluster 1) references entry 2 (the entry for cluster 2) to indicate that cluster 2 is the next cluster in which data for file X is stored, entry 2 references entry 3 to indicate that cluster 3 is the next cluster in which data for file X is stored, and so on. Thus, the entries are linked together in a linked-list fashion. In the manner described above, a FAT is generated which accurately reflects the file storage information for storage medium 20, and which has a format compatible with the data processing mechanism 28. In the preferred embodiment, the FAT is stored into memory 14 once it is generated so that it may be easily referenced later. Alternatively, if so desired, the FAT may be generated each time a request is received from mechanism 28. In the example provided above, there was only one file stored on medium 20. It should be noted though that any number of files may be stored on medium 20 and a FAT would still be generated in the manner described.

Referring again to FIG. 3, once the FAT is generated, information from the generated FAT is provided 46 to the data processing mechanism 28. This gives mechanism 28 the information that it needs to access the storage medium 20. Thereafter, interface 32 receives 48 another request from mechanism 28. In response, interface 32 determines 50 whether the request is one for more FAT information or one for data. This determination is preferably made by analyzing a start sector number which is contained in the request. If the start sector number is less than a predetermined number, then it is known that the request is one for FAT information. Otherwise, the request is a data request. If the request is for FAT information, interface 32 references 58 the FAT stored in memory 14 and provides 60 the desired information to mechanism 28.

If, however, the request is a data request, interface 32 translates 52 the data request into a read request which can be processed by device driver 32 to access information stored on medium 20. To elaborate, realize that the data request is made by mechanism 28, and that mechanism 28 relies on FAT information for accessing the storage medium 20. This means that the data request made by mechanism 28 will be based on FAT information. The device driver 32, however, cannot process requests made in terms of FAT information since it does not interact with the storage medium 20 in a FAT-like manner. Thus, to reconcile the differences between mechanism 28 and driver 32, interface 30 translates the data request from mechanism 28 into a request to read data from one or more physical locations on the storage medium 20. Since interface 30 understands and has access to both the FAT information and the file storage information, it has the necessary resources to determine which portion or portions of data mechanism 28 wishes to read and to determine where on the storage medium 20 this data can be found. Once interface 30 knows which physical location or locations on medium 20 need to be accessed, it sends a read request to the driver 32, this read request containing a reference to a specific location or locations on the medium 20. The request is now in a form that driver 32 can process. Thereafter, driver 32 processes 54 the read request to access the medium 20 and to retrieve requested data from the location or locations specified. More particularly, driver 32 generates the hardware calls necessary for reading data from the storage medium. This data, once retrieved, is passed to interface 30 which, in turn, relays 56 the data to mechanism 28. Information from storage medium 20 is thus conveyed to mechanism 28.

With reference to FIG. 2, and with the assumptions that mechanism 28 is a data compression program and that CD-ROM 24 has a compressed file stored thereon, the overall operation of system 10 will now be described. Upon boot-up, operating system 26 is loaded from hard disk 16 into memory 14 and executed by microprocessor 12 to set up the environment in which all of the components will operate. Operating system 26 may be DOS, UNIX, OS/2, the Macintosh Operating System, or it may be a number of other operating systems. After operating system 26 is loaded and running, the other programs may be loaded into memory 14 either as part of the boot-up process or in response to user commands. When device driver 32 is loaded into memory 14, it is assigned a logical drive designation (usually a logical drive letter) by operating system 26. After loading, driver 32 initializes the CD-ROM drive/CD-ROM assembly 22, 24 to prepare it for operation with the operating system 26. It is preferably during this stage that file storage information is read from the CD-ROM 24 and stored in memory 14 for later reference. After driver 32, the interface 30 of the present invention is preferably loaded into memory 14. Upon loading, interface 30 is also assigned a logical drive letter (preferably different from the one assigned to driver 32) by operating system 26. When executed by microprocessor 12, interface 30 logically attaches itself to device driver 32. Thereafter, compression program 28 is loaded into memory 14. System 10 is now ready for operation.

In order for compression program 28 to properly access CD-ROM 24, program 28 first needs to be logically attached to a compatible block device driver. In the present case, interface 30 is the block device driver. Thus, a command is issued (preferably by the user) to attach the program 28 to the drive letter assigned to interface 30. In response to this command, program 28 sends an initial request to interface 30 for FAT information relating to the CD-ROM 24. In response, interface 30 obtains file storage information from driver 32, generates a FAT using the file storage information, stores the FAT into memory 14, and sends the requested FAT information to compression program 28. The program 28 now has the information that it needs to access the compressed file stored on CD-ROM 24.

Program 28 accesses the compressed file by issuing a data request to interface 30, this data request being based on the FAT information provided by interface 30. Since this request is not in a format that driver 32 can understand, interface 30 translates the data request into a read request which references one or more specific physical locations on the CD-ROM 24. The driver 32 receives the read request and, in response, generates the hardware calls necessary for accessing the CD-ROM 24 and retrieving information from the physical location or locations specified by interface 32. Once retrieved, the compressed file information from CD-ROM 24 is passed on to interface 30 which, in turn, relays the information to compression program 28. Program 28 thereafter decompresses the compressed file information to derive meaningful information therefrom. In this manner, the compressed file on CD-ROM 24 is effectively and efficiently accessed.

Thus far, the process for accessing a compressed file on a CD-ROM has been described. With reference to the flow diagram provided in FIG. 5, the process for storing a compressed file onto a CD-ROM will now be described. A compressed file is preferably stored by first creating 70 a compressed volume on hard disk 16. This compressed volume is a structure that compression program 28 recognizes as containing compressed data. Once the compressed volume is created, compressed data (preferably compressed by means of compression program 28) is copied 72 into the volume created on disk 16. Preferably, file storage information is also stored with the compressed volume to facilitate subsequent access of the volume. Thereafter, an image of the compressed volume is created 74, preferably by using generally available premastering software. The image created preferably conforms to the ISO-9660 standard. Finally, the image of the compressed volume is recorded 76 or mastered onto the CD-ROM 24, preferably using commercially available CD recording equipment or high volume replication equipment. A compressed file is thus captured on a CD-ROM 24. A compressed file captured in this manner may be accessed by way of the method of the present invention as previously described.

While the present invention has been described with reference to a specific example, it should not be construed to be so limited. Various modifications may be made by one of ordinary skill in the art with the benefit of this disclosure without departing from the spirit of the invention. For example, the invention has been described with reference to the specific implementation of accessing a compressed file stored on a CD-ROM. It should be noted, however, that the concepts taught herein may be applied to any situation wherein it is desirable to interface a FAT reliant mechanism with a storage medium having no FAT. Thus, many other implementations are possible. Consequently, the invention should not be limited by the example used to illustrate it but only by the scope of the appended claims.

What is claimed is:

1. A method for storing compressed data onto a compact disc read only memory (CD-ROM) and directly retrieving at least one of the compressed files from said CD-ROM, comprising:

creating a compressed volume on a storage medium;

compressing a plurality of files;

storing the compressed files into said compressed volume;

recording said compressed volume onto the CD-ROM, wherein said CD-ROM does not have a file allocation table;

receiving a request to access a file allocation table from said CD-ROM to retrieve at least one of the compressed files stored on said CD-ROM;

generating said file allocation table dynamically based upon information stored on said CD-ROM; and retrieving responsive to said generated file allocation table, said at least one of the compressed files directly from said CD-ROM.

\* \* \* \* \*